No. 734,857. PATENTED JULY 28, 1903.
H. HALSEY.
ELECTRIC BATTERY.
APPLICATION FILED APR. 18, 1902.

NO MODEL. 2 SHEETS—SHEET 1.

Witnesses
Robert H. Ireland
Lester C. Taylor

Henry Halsey Inventor
By his Attorney
C. V. Edwards

No. 734,857. PATENTED JULY 28, 1903.
H. HALSEY.
ELECTRIC BATTERY.
APPLICATION FILED APR. 18, 1902.
NO MODEL. 2 SHEETS—SHEET 2.

Witnesses
Robert D. Ireland
Lester C. Taylor

Henry Halsey Inventor
By his Attorney
C. W. Edwards

No. 734,857. Patented July 28, 1903.

UNITED STATES PATENT OFFICE.

HENRY HALSEY, OF NEW YORK, N. Y., ASSIGNOR, BY MESNE ASSIGNMENTS, TO HALSEY ELECTRIC GENERATOR COMPANY, OF JERSEY CITY, NEW JERSEY, A CORPORATION OF NEW JERSEY.

ELECTRIC BATTERY.

SPECIFICATION forming part of Letters Patent No. 734,857, dated July 28, 1903.

Application filed April 18, 1902. Serial No. 103,648. (No model.)

*To all whom it may concern:*

Be it known that I, HENRY HALSEY, a citizen of the United States, residing at New York city, in the county of New York and State of New York, have invented certain new and useful Improvements in Electric Batteries, of which the following is a full, clear, and exact specification.

This invention relates to batteries, and has particular reference to that class of batteries in which means are provided for maintaining movement of the electrolyte or one of the elements of the battery.

The present invention has for its object the construction of a battery wherein means are provided for brushing one or more of the elements of the battery without necessarily moving either the electrolyte or the elements, and, further, to provide a battery wherein the various parts shall be simple in their construction and readily assembled in operative relation to each other.

The invention also comprehends other features of advantage, which will be more particularly referred to hereinafter.

Figure 1:
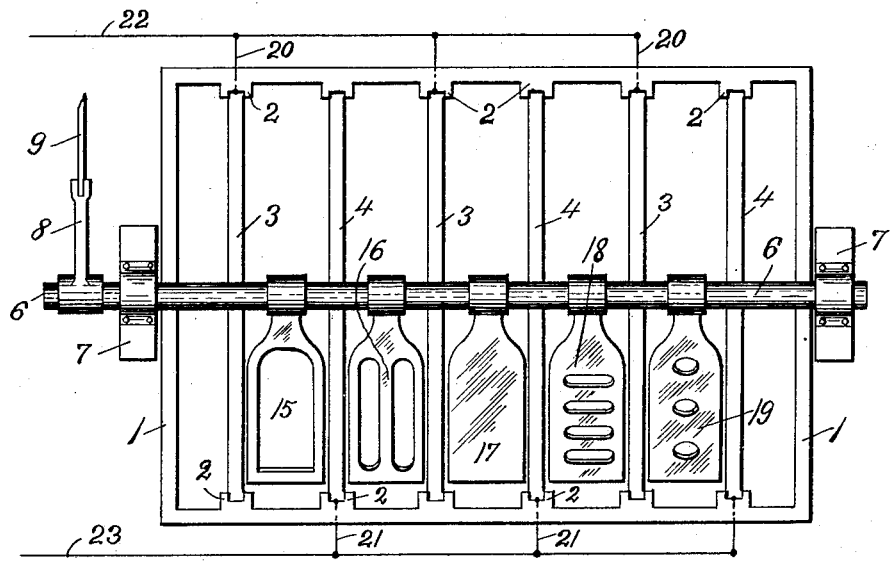
Figure 2:
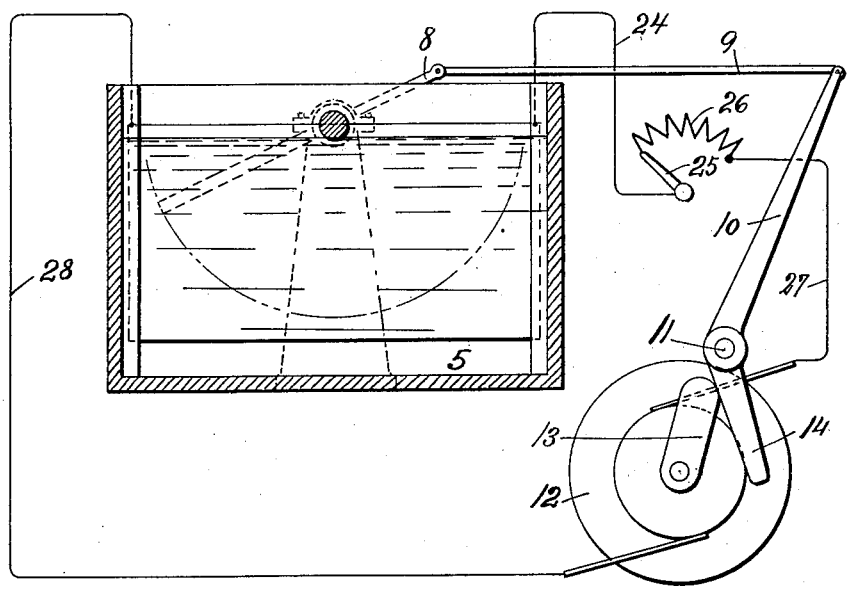
Figure 3:
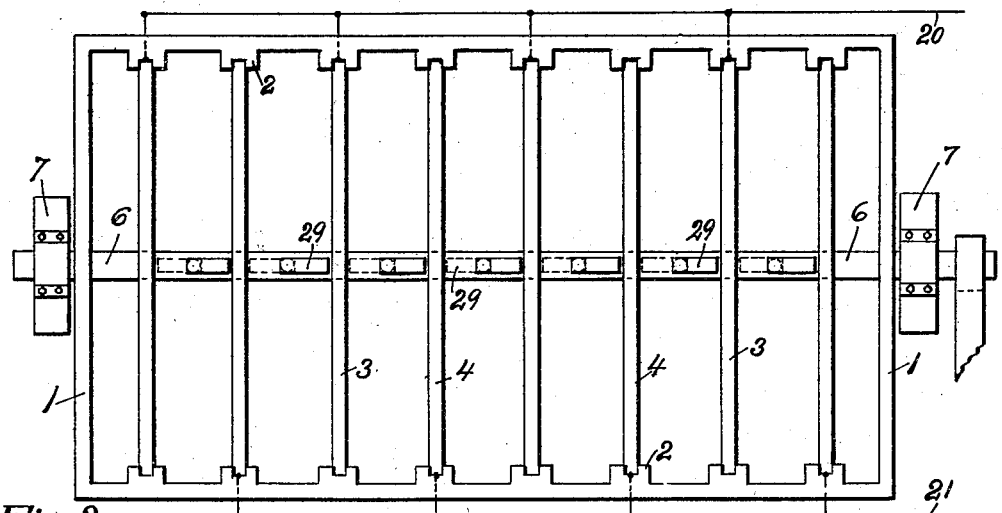
Figure 4:
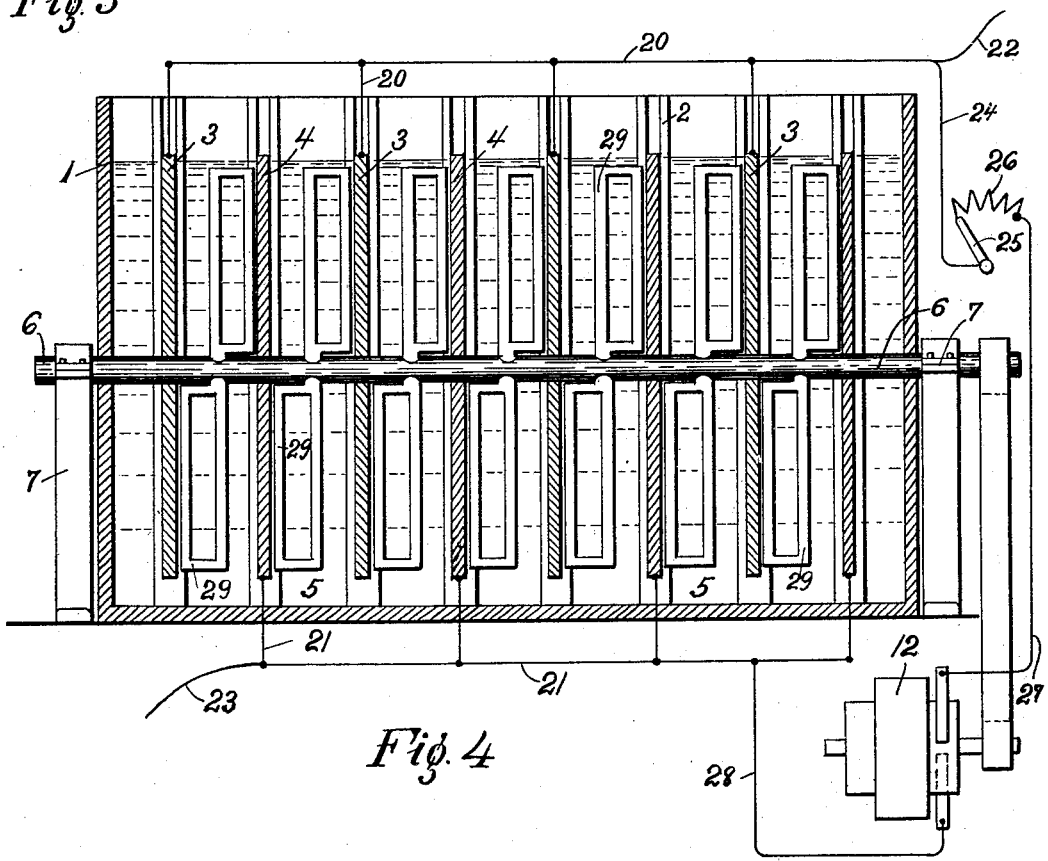

In the drawings, Figure 1 is top view of a battery embodying my invention. Fig. 2 is a side sectional view of the same, showing the manner of oscillating the stirrers. Fig. 3 is top view of a modified form of battery, and Fig. 4 is a sectional view of the same.

A suitable case 1 is provided at its respective sides with brackets 2 2 2 2, in which the elements 3 4 3 4 are submerged. The elements in this instance may comprise simple square plates which are adapted to slide vertically into the brackets, the elements being separated from each other in any suitable distance. The electrolyte 5 is poured into the receptacle and fills the spaces between the respective elements. The shaft 6, mounted in bearings 7 7, carried by the casing 1, extends along the top of the battery transversely to the respective elements, and suitable means are provided for oscillating this shaft. Such means in the present instance comprise the arm 8, mounted upon shaft 6, a connecting-rod 9 connecting the end of said arm with the lever 10, pivoted intermediate its ends upon the stud 11. A motor 12 carries upon its shaft a cam 13, adapted to engage and move the end 14 of the lever 10. In each of the compartments formed between the elements a stirrer 15 16 17 18 19, composed of any suitable material—such, for example, as hard rubber—is mounted upon shaft 6, whereby when shaft 6 is oscillated the stirrer will swing back and forth in the compartment. These stirrers may be of any suitable shape. Preferably they lightly contact or very nearly contact with the elements on each side. In the drawings I have illustrated several forms which these stirrers may assume; but it will be understood that any other convenient form may be utilized instead. For example, stirrer 15 has its central portion cut away to such an extent that the stirrer is substantially a single strip of the properly-looped form. Stirrers 16, 18, and 19 also have their central portions more or less cut away. These forms all present very little resistance to the electrolyte. The solid form, however, such as stirrer 17, may be employed. If the stirrers be solid, the oscillating of the same will move the electrolyte, and therefore when solid stirrers are employed the edges need not make contact with the elements, because the movement of the electrolyte will ordinarily suffice to prevent polarization. When the central portion of the stirrers are cut away, the brush should make light contact with the elements.

The respective elements are connected by wires 20 and 21 with the respective conductors 22 and 23 of the external circuit.

A conductor 24 leads from one element of the battery to the controller-handle 25, which makes contact with the resistance 26, connected by wire 27 to the motor. A conductor 28 leads from the motor to the other element of the battery.

In the operation of the battery thus far described when the motor-circuit is closed the cam 13 oscillates the end 14 of lever 10, and thus rocks the stirrer back and forth in the electrolyte between the elements. The stirrer when rocked back and forth, either by mechanical contact or by causing the electrolyte to brush against the elements, prevents the polarization of the latter. As the rate of speed of the motor, and consequently the rate of speed of the stirrers, varies the output of the battery will correspondingly vary.

In the modification shown in Figs. 3 and 4 instead of oscillating the stirrers the same are rotated. In this instance the shaft 6 extends the length of the case 1, passing through the several elements 3 4 3 4. Upon the shaft are mounted the stirrers 29, which are adapted to brush the elements 3 4 as the shaft 6 is rotated. In this instance the several elements 3 are connected by wires 20 with the wire 22 of the external circuit and by wire 24 with the controller-arm 25, resistance 26, and wire 27 to motor 12. Elements 4 are connected by wires 21 with the external circuit 23 and with wire 28, which connects with the motor. The operation of the battery shown in Figs. 3 and 4 is substantially the same as the operation of the battery shown in Figs. 1 and 2, with the exception that the stirrers are rotated instead of rocked.

The constructions shown in the drawings are advantageous in that the cover may be readily removed without disturbing any connections, and, in fact, any one or more of the elements may be removed by simply sliding the same out of its position.

It will be understood that the constructions shown may be varied in many respects without departing from the scope of the invention, and I therefore desire it to be understood that I do not herein limit myself to the specific construction shown.

Having thus described my invention, I declare that what I claim as new, and desire to secure by Letters Patent, is—

1. In a battery, the combination with the electrolyte and the elements, of a stirrer having its central portion cut away, and means for moving said stirrer between said elements, substantially as described.

2. In a battery, the combination with the electrolyte and the elements, of a stirrer contacting with said elements and having its central portion cut away, and means for oscillating said stirrer between said elements, substantially as described.

3. In a battery, the combination with the electrolyte and the elements, of a stirrer contacting with said elements, and having its central portion cut away, and means for moving said stirrer between said elements at variable rates of speed, substantially as described.

In testimony whereof I affix my signature in presence of two witnesses.

HENRY HALSEY.

Witnesses:
HENRY BEST,
C. V. EDWARDS.